US 6,367,946 B1

(12) United States Patent  
Leifer et al.

(10) Patent No.: US 6,367,946 B1  
(45) Date of Patent: *Apr. 9, 2002

(54) LIGHT APPARATUS FOR ILLUMINATING A COMPACT COMPUTER VIDEO SCREEN

(75) Inventors: Robert Leifer, Dix Hills; Gabe Neiser, Rego Park, both of NY (US)

(73) Assignee: Arista Enterprises Inc., Hauppauge, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 09/614,225

(22) Filed: Jul. 13, 2000

Related U.S. Application Data

(63) Continuation-in-part of application No. 09/590,992, filed on Jun. 9, 2000.

(51) Int. Cl.$^7$ ................................................. F21L 4/00
(52) U.S. Cl. ........................ 362/190; 362/109; 362/124
(58) Field of Search .............................. 362/190, 109, 362/85, 234, 33, 124

(56) References Cited

U.S. PATENT DOCUMENTS

| | | | |
|---|---|---|---|
| 4,581,684 A | 4/1986 | Mazzucco | 362/98 |
| 4,598,340 A | 7/1986 | Dwosh et al. | 362/98 |
| 5,091,832 A | 2/1992 | Tortola et al. | 362/109 |
| 5,117,339 A | 5/1992 | Tortola et al. | 362/109 |
| 5,119,239 A | 6/1992 | Iaquinto et al. | 359/811 |
| 5,130,907 A | 7/1992 | Tortola et al. | 362/109 |
| 5,165,779 A | 11/1992 | Tortola et al. | 362/109 |
| 5,183,324 A | 2/1993 | Thomas et al. | 362/103 |
| 5,280,416 A | 1/1994 | Hartley et al. | 362/98 |
| 5,325,280 A | 6/1994 | Tortola et al. | 362/234 |
| 5,379,201 A | 1/1995 | Friedman | 362/191 |
| 5,695,271 A | 12/1997 | Zeller | 362/98 |
| 6,186,636 B1 | 2/2001 | Naghi et al. | |
| 6,273,581 B1 * | 8/2001 | Neiser | 362/109 |

* cited by examiner

Primary Examiner—Sandra O'Shea  
Assistant Examiner—Ronald E. DelGizzi  
(74) Attorney, Agent, or Firm—Keusey, Tutunjian & Bitetto

(57) ABSTRACT

An accessory lighting assembly for selectively illuminating user selected areas such as, for example, compact computer devices, books and other desired areas. The light source is directed away from user selected area for illumination and a reflective surface is selectively positionable to intercept the light emanating from the light source and re-direct it toward the user selected area. The directing of the light away from the user selected area for illumination and subsequent reflecting back toward the user selected area results in an evenly diffused light being applied to the user selected area, while completely eliminating the otherwise experienced hot spots or dark spots common in prior art accessory light assemblies.

22 Claims, 14 Drawing Sheets

LIGHT APPARATUS FOR ILLUMINATING A COMPACT COMPUTER VIDEO SCREEN

RELATED APPLICATION INFORMATION

This application is a Continuation-In-Part of U.S. patent application Ser. No. 09/590,992 filed Jun. 9, 2000.

BACKGROUND OF THE INVENTION

1. Field of the Invention

The present invention relates to compact lighting devices, and more particularly, to a compact lighting device for selective illuminating a desired area.

2. Description of the Related Art

Compact computers and video game devices having video viewing screens are becoming more and more popular and typically comprise hand-held portable, battery-operated devices. The viewing screen is typically a liquid crystal display (LCD) that is generally flat and displays information and or provides the screen for playing video games. Such compact computers and video games may include, but are not limited to: calculators, computer video games, lap top computers, and other computers where a variety of software is employed. In particular, compact video games, such as the compact video game systems known as GAME BOY™, GAME BOY POCKET™ and GAME BOY COLOR™ (Trademarks of Nintendo of America), are completely self-sustained video game systems which may be operated by interchangeably employing a collection from a library of software game packs. These Nintendo video game systems provide a compact, self-contained, battery-operated, portable hand-held computer with a cross key joy stick (directional-pad or D-pad) to operate the game, start and select buttons, action buttons and an LCD-type screen, together with volume controls so as to display and enable the user to display images and play games.

While video display screens are employed and typically include a flat LCD-type screen, such LCD-type display screens are often difficult to observe by the user in partial or low light conditions, such as, for example, automobiles, planes, trains, buses, and the like due to the lack of illumination on the LCD screen to permit suitable contrast during use.

U.S. Pat. Nos. 5,091,832 and 5,325,280 show a light apparatus for use with compact computer screens. As shown and described, the body includes an open video space designed to be the same size as the LCD video screen of the compact computer apparatus. The body includes a pair of sloped or angled white colored side panels and a top and bottom side panel and the white or light colored extending directly generally perpendicular to the video screen rather than sloped as illustrated for the side panels. The top side panel is integral with and extends from the bottom molded section of the body when the body sections are matingly engaged to form the body, the top panel with the panels on the top section then form a rectangular, open video viewing space of the apparatus.

The light apparatus includes a pair of light bulbs placed on either side of sloping panels and which side panels also include a short, solid, upward extending light shield so as to prevent the direct glare of the light bulbs onto the LCD screen and to provide for indirect lighting through reflection on the light-colored side panels onto the LCD viewing screen.

U.S. Pat. Nos. 5,117,339 and 5,165,779 disclose combined light and magnifier devices for hand-held computers with video screens. Each of these patents show a battery operated light assembly that is mounted to a separate assembly mounted adjacent the view screen and spaced from the magnifier lens. The devices shown in these patents are adapted to provide a screen magnifier while also providing additional light to the screen for playing in low light conditions.

Unfortunately, the use of an LCD screen in these hand-held video game devices makes the illumination of the same difficult. The primary reason for this difficulty is due to the fact that the plastic cover to the actual LCD screen is generally of a high-gloss finish, and as such has a tendency to reflect light. This reflection of light primarily occurs when the light shines substantially directly onto the screen, and thus, the high-gloss screen cover prevents the light from penetrating the cover and thereby illuminating the LCD screen.

In all of the aforementioned patents, the lighting assemblies utilize various different light sources that are generally directed toward the screen. The use of white or light colored frame sides is implemented in an effort to diffuse the light before projected onto the screen, however, neither the white or light colored sides of the frame prevent spotting or "hot spots" caused by the illumination of the light source immediately adjacent the viewing screen or even worse, when positioned so as to project light directly at the viewing screen. As such, the light source, in the area of disposition, causes a glare spot or "hot spot" on the high-gloss glass cover to the actual LCD display screen. Thus, the user's view is obstructed and not increased in these hot spot areas. Furthermore, dark spots are created on the screen where the additional light is not effectively distributed across the screen. In view of these drawbacks of the prior art patents, it would be desirable to provide a lighting assembly for a hand-held computer gaming device that does not have any screen "hot spots" or dark spots, and actually works to increase the viewing of the display screen.

In addition, book lights or portable reading lamps all operate on the principle of selectively disposing a light source, such as, for example, a light bulb in a position over the area to be illuminated. U.S. Pat. Nos. 4,598,340, 4,581,684, 5,280,416 and 5,695,271 all disclose various reading light assemblies where the light source is adjustable so as to be positioned over the area to be illuminated. In each of these prior art devices, the light source generates light that is not evenly dispersed across the desired area and also requires constant maneuvering by the user to accommodate their use of the device.

Other light devices such as those shown in U.S. Pat. Nos. 5,183,324 and 5,379,201 also dispose the light source adjacent the area to be illuminated and as such suffer the same consequences of hot and dark spots as previously described with respect to the hand held video game devices.

SUMMARY OF THE INVENTION

It is therefore an object of the invention to provide an improved lighting assembly for hand-held video games that does not cause "hot spot" or other glaring effects from the use of light source to illuminate the LCD display.

It is yet another object of the invention to provide an improved lighting assembly for hand-held video games that effectively utilizes reflection techniques to efficiently illuminate the LCD display screen of the game device.

It is a further object of the invention to provide an accessory lighting device that effectively utilizes reflection techniques to efficiently illuminate the desired area.

This and other objects are achieved in accordance with an embodiment of the present invention in which a light assembly for use in enhancing the view of a compact computer video screen includes a base portion adapted to fit over a top edge of the compact computer device. An upward extension is pivotally connected to the base portion and a reflector housing is pivotally connected to the upward extension. A light source is disposed within a recess in the upward extension and positioned so as to direct light away from the video screen. A reflector is disposed on the underside of the reflector housing and is adapted to reflect light from the light source downward toward the video screen. Through the variable positioning of the upward extension and reflector housing (via the pivotal connections) the user can selectively adjust the amount of light reflected down onto the video display screen.

In accordance with another embodiment of the present invention, a light assembly for use in enhancing the view of a user selected area includes a light source disposed so as to substantially direct light in a direction away from the user selected area and a reflector adjustable positioned to intercept the light from the light source and redirect it (i.e., reflect it) back toward the user selected area. With this configuration, the light dispersion on the user selected area is more evenly distributed in a diffused manner. This reflection technique for the compact of portable light source increases the scope of applications for such a light device and provides superior illuminating features.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the several views:

FIG. 15b is a cross-sectional view of the accessory light apparatus taken alon lines XV—XV of FIG. 15a.

DETAILED DESCRIPTION OF PREFERRED EMBODIMENTS

Figure 1A:
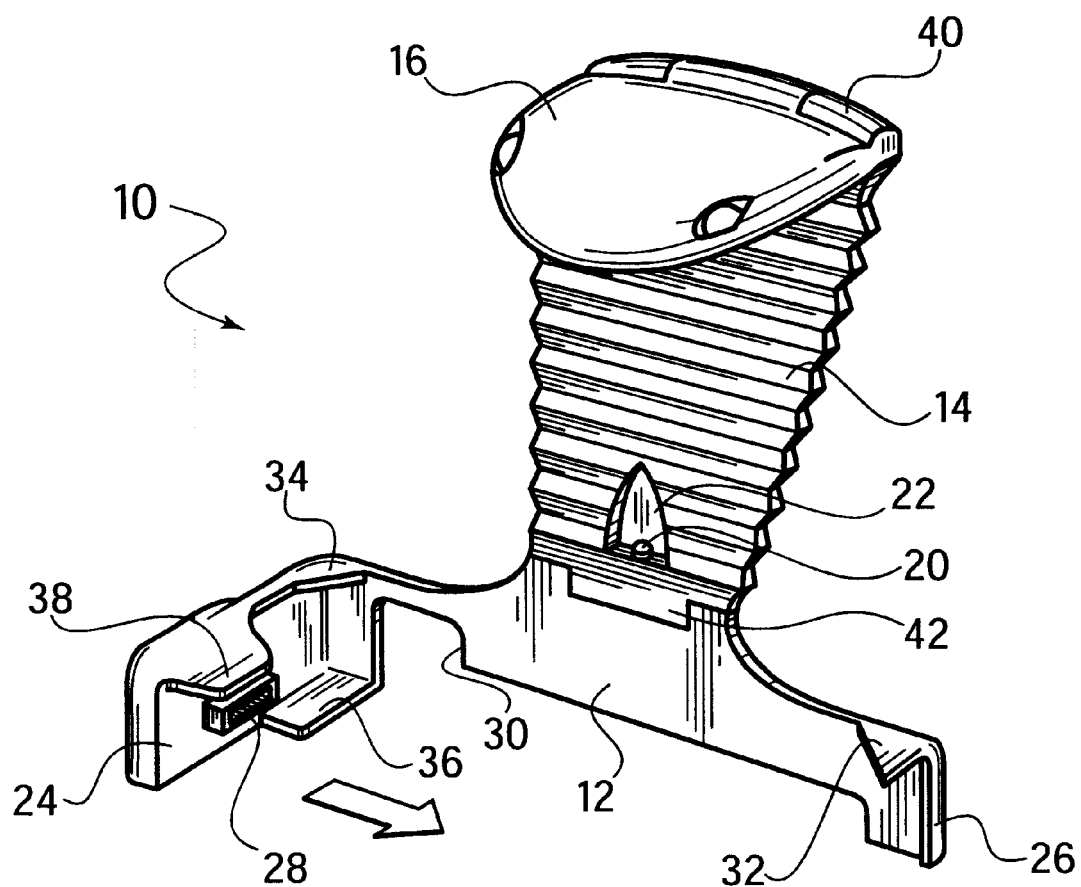
FIG. 1a is a perspective view of the game light assembly according to an embodiment of the invention.
Figure 1B:
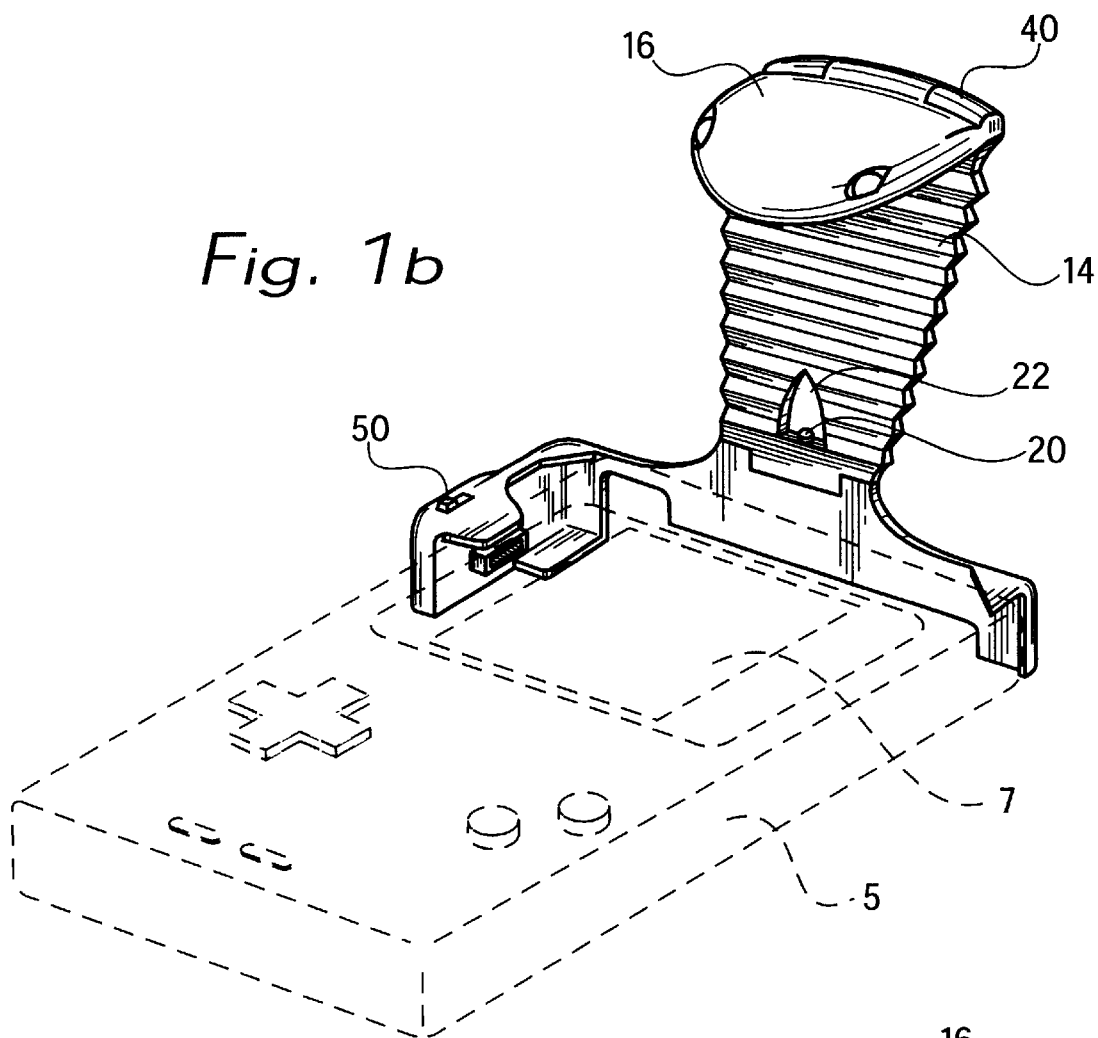
FIG. 1b is a perspective view of the game light assembly with the game playing apparatus shown in phantom.

FIGS. 1a and 1b show the light assembly 10 according to an embodiment of the invention. Light assembly 10 includes a base portion 12 adapted to be releasably attached to a hand held video game device 5 and an upper portion having an upward extension 14 and reflector housing 16. According to one embodiment, the base portion 12 has a left side 24 that includes a power supply plug 28 which is adapted and positioned to be inserted into the external link port of the hand held video game device. Power supply plug 28 engages the external link port of the hand held video game device 5 when disposed in its operable position (shown in FIG. 1b) and thereby electrically connects the light assembly 10 to the battery power supply of the game device 5. In this manner, the light assembly 10 does not need its own power supply or batteries. In one embodiment, an on/off power switch 50 can be provided on the base portion 12 which allows the user to selectively turn on and off the light assembly 10. In another embodiment, there is no power switch on base portion 12 and the light assembly is powered on and off with the switching on and off of the game device. Those of ordinary skill in the art understand that the electrical connections made within the light assembly and the manner of manufacturing the same may be made by any suitable known type of electrical connections and manufacturing methods. Light assembly 10 is preferably made of molded plastic to dimensionally fit the Game Boys™, but may also be made of any suitable known material capable of being shaped into a desired style.

FIGS. 1c-1e and FIG. 4 show various other embodiments where the light assembly 10 includes its own power source.

Figure 1C:
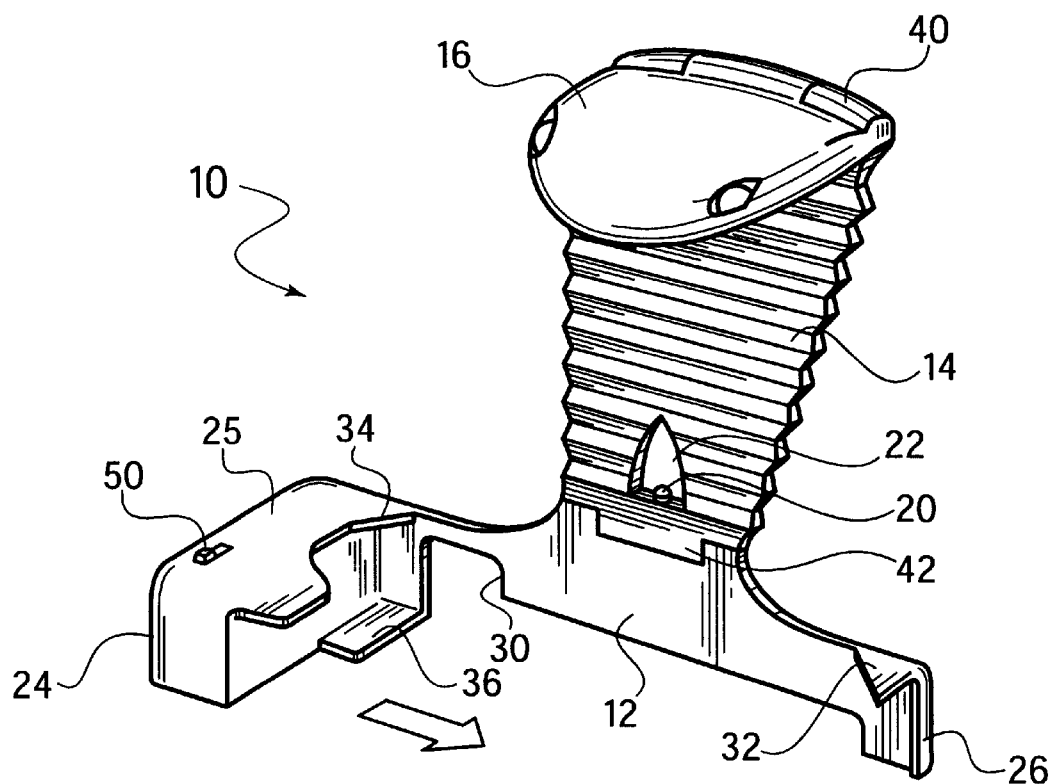
FIG. 1c is a perspective view of the game light assembly according to another embodiment of the invention.
Figure 1D:
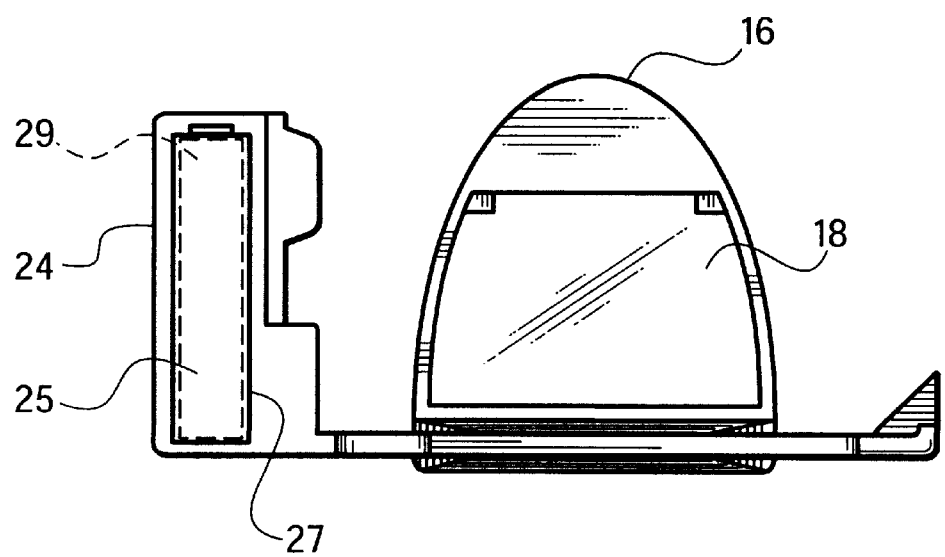
FIG. 1d is a bottom view of the game light assembly according to the embodiment of FIG. 1c.
Figure 1E:
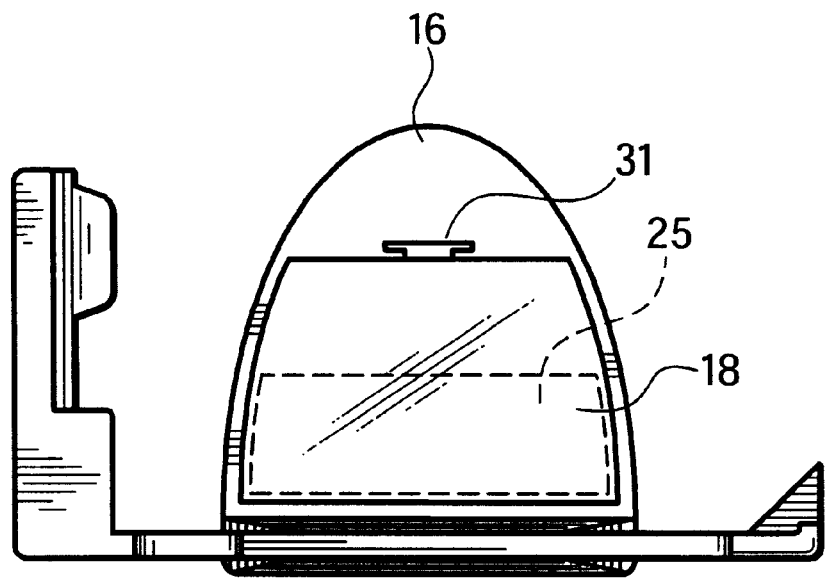
FIG. 1e is a bottom view of the game light assembly according to another embodiment of the invention.
Figure 1F:
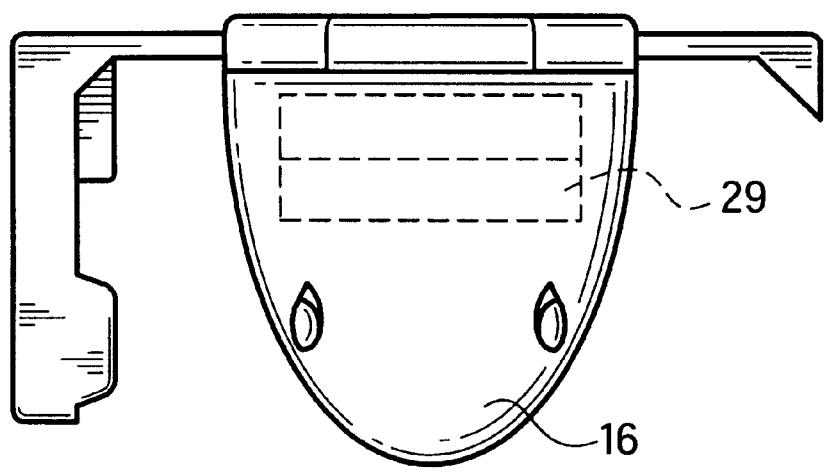
FIG. 1f is a top view of the game light assembly according to the embodiment of FIG. 1e.
Figure 4:
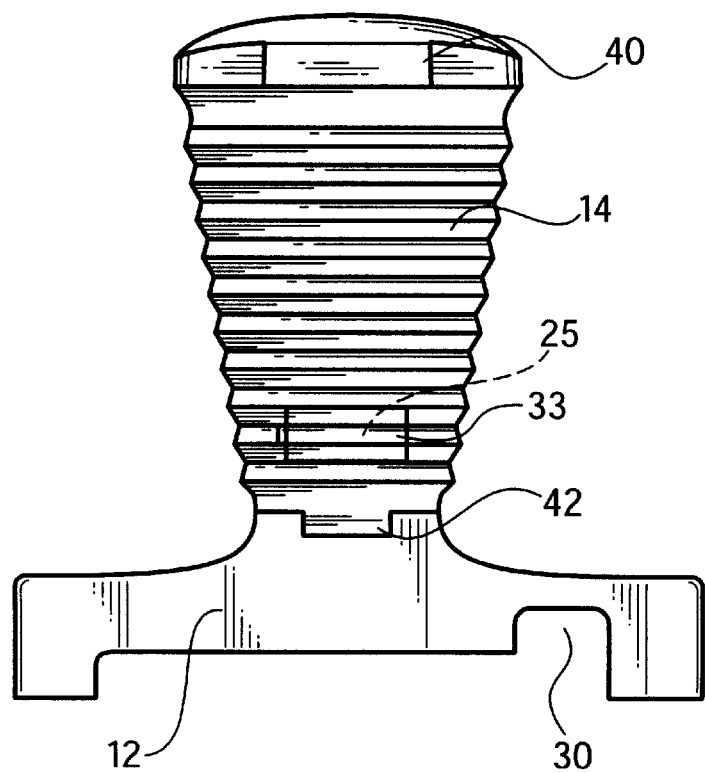
FIG. 4 is a rear view of the game light assembly according to an embodiment of the invention.

Referring to FIGS. 1c and 1d, a battery compartment 25 is provided within base portion 12 and includes an access cover 27 that is releaseably connected to base portion 12 with a snap or other suitable connection. The size and type of battery or batteries 29 contained within the compartment 25 is a matter of design choice. Those of ordinary skill in the art will recognize that the type of battery and size thereof can be modified without departing from the spirit of the present invention. FIGS. 1e and 1f show the disposition of the battery compartment 25 within reflector housing 16. In this embodiment, the reflector 18 is connected to or integrally formed with the compartment cover 31. Thus, the battery (ies) 29 are covered by the compartment cover 31 and are thereby contained within housing 16 underneath the reflector 18. FIG. 4 shows another embodiment where the battery compartment 25 is disposed within upward extension 14 and covered by a compartment cover 33. Compartment cover 33 is preferably molded to conform to the shape and texture of the upward extension 14 and thereby is concealed from obvious view. Those of ordinary skill in the art will appreciate that the actual location of the battery compartment 25 within the light assembly 10 is also a matter of design choice.

Light assembly 10 is disclosed in the style of a cobra snake. Those of skill in the art will recognize that the concepts and technology disclosed herein may be applied to a light assembly of any style and shape. Thus, the cobra style depicted herein is only one exemplary embodiment style of the light assembly of the present invention. In addition, the lighting system and technology of the present invention can be used for other applications such as, for example, a book light.

The upward extension 14 includes a recess 22 adapted to receive and house a light source 20 that is directed upward away from the display screen 7 of the game device 5. Light source 20 can be any suitable known light source such as, for example, an incandescent bulb, a light emitting diode (LED), a directional LED, etc. A directional LED provides substantially collimated beam of light that is easily directable toward a particular surface. Those of skill in the art will recognize that the type of light source may be a matter of design choice and may be changed without departing from the spirit of this disclosure. In one preferred embodiment, the light source includes a lens or other means for facilitating the directability or focusing of the light toward the reflective surface. In another preferred embodiment, recess 22 is formed by providing an additional cavity 23 (FIG. 3b) that protrudes from the backside of the upward extension 14. This cavity 23 forms the recess 22 on the front side of the upward extension 14.

The base portion 12 of the light assembly 10 includes various integrated extensions 34, 36 and 38 in order to increase its strength and integrity during attachment and detachment to and from the game device 5. Those of ordinary skill in the art will recognize that other methods and designs for these portions of base 12 can be altered without departing from the scope of the invention. FIGS. 10a–12 show another embodiment of the base portion (to be discussed later) that eliminates extensions 34, 36 and 38 and provides a stronger design by integrating thicker support ribs and facia or upper rim 102. The left side 24 of the base portion 12 includes a power supply plug 28 that is positioned so that when light assembly 10 slidably engages the top edge of the game device 5 in the direction shown by the arrow in FIG. 1a, power supply plug 28 is inserted into the external link port (not shown) of the game device 5. Although the external link port of the game device 5 is generally used to link the game device to another for head-to-head game playing, by designing plug 28 to contact electrical contacts within the link port, light assembly 10 can utilize the power of the game device (e.g., internal or external battery power supplies) to power light source 20. Thus, the use of other additional power supplies or batteries to power the light assembly are not necessary. In one embodiment (discussed later with respect to FIGS. 3a–3c ), access to the link port will continue to be provided while the light assembly 10 is mounted in its operable position on game device 5. The game device 5 also includes a volume control (not shown) that is disposed adjacent the link port. As such, the left side 24 of the base portion 12 is designed so as to not interfere with the operation of the adjacently positioned volume control dial.

Figure 2:
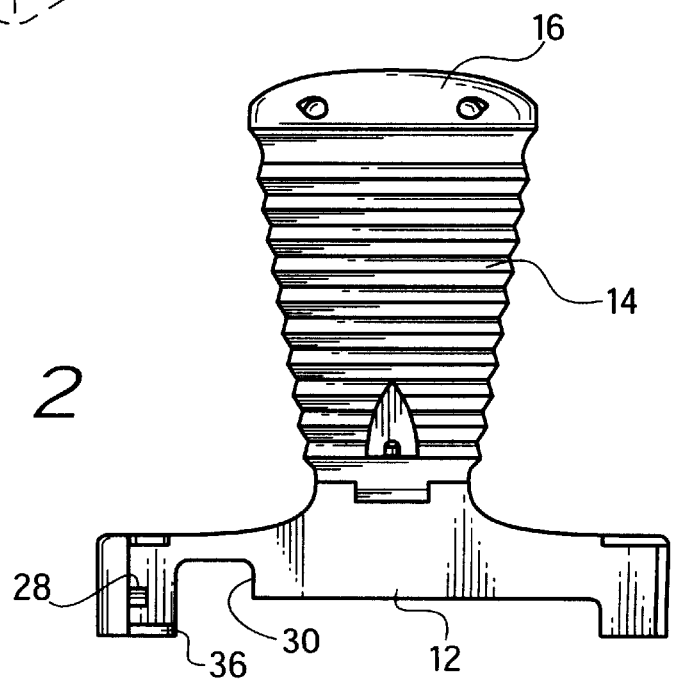
FIG. 2 is a front view of game light assembly according to an embodiment of the invention.

Depending on the particular game device 5, an infrared (IR) window (not shown—eg., GAME BOY™ and GAME BOY COLOR™) or on/off power switch (not shown—e.g., GAME BOY POCKET™) is disposed on the top edge of the game device. As such, base portion 12 includes a cutout or opening 30 (FIGS. 1a, 1b and 2) positioned so as to accommodate the IR window or on/off switch on the game device and keep them accessible when light assembly 10 is disposed in its operable position.

Figure 3A:
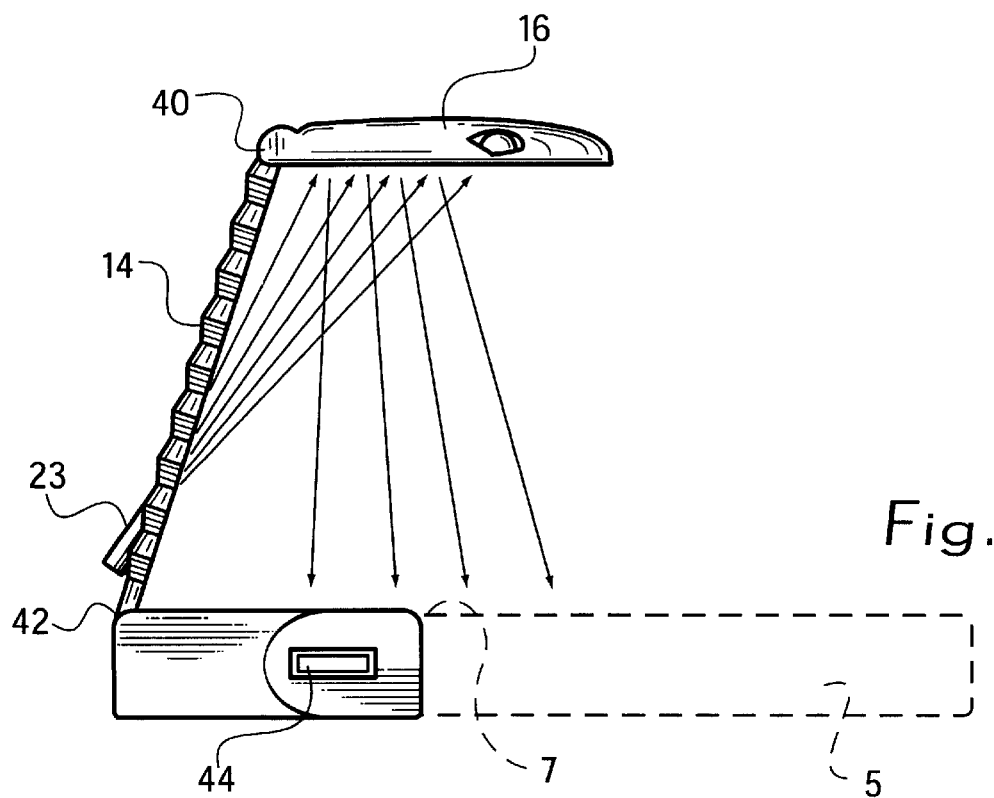
FIG. 3a is a side view of the game light assembly according to an embodiment of the invention.
Figure 3B:
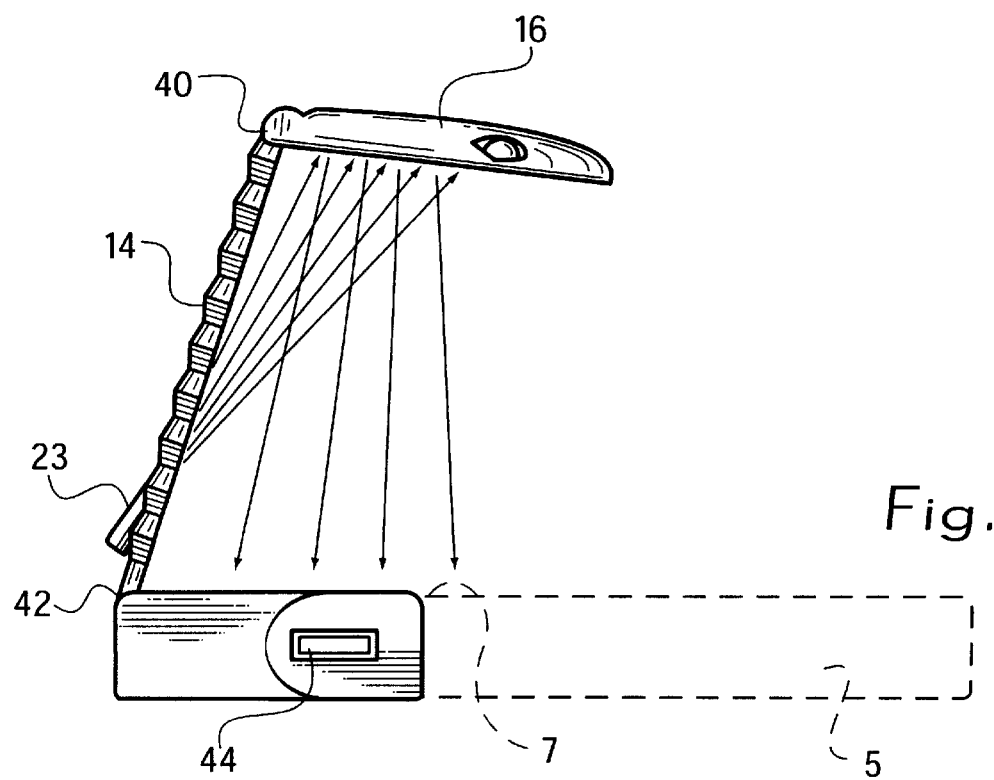
FIG. 3b is a side view of the game light assembly according to an embodiment of the invention.
Figure 5:
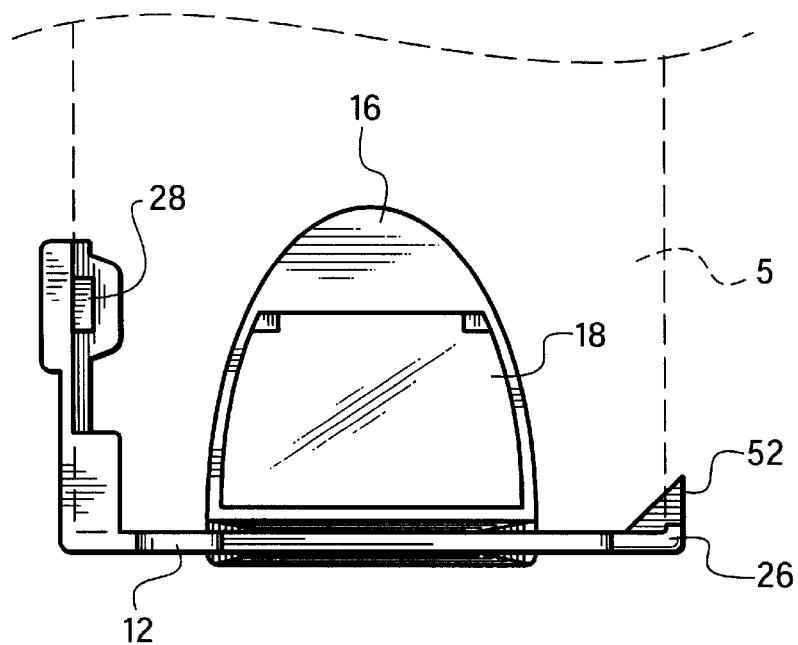
FIG. 5 is a bottom view of the game light assembly according to an embodiment of the invention.

Referring to FIGS. 1a, 1b, 3a, 3b and 5, during operation light source 20 is illuminated and positioned within recess 22 such that the light emanating therefrom is directed upward toward reflector housing 16 and away from display screen 7. As shown in FIG. 5, reflector housing 16 includes a substantially flat reflector 18 disposed on the underside of the housing. Through the use of hinges 40 and 42, the reflector housing 16 and upward extension 14 can be selectively positioned to reflect the light back down toward the display screen 7 of the game device 5. Reflector 18 can be any suitable known type of reflector such as, for example, a mirror, reflective mylar, hot stamped chrome plate etc. It is also contemplated to have reflector 18 integrally formed into the underside of the reflector housing 16. As mentioned previously, light source 20 is directed upward toward reflector 18 on the underside of housing 16. As such, the light emanating from light source 20 is reflected downward by the reflector 18 and thereby illuminates the display screen 7 in an even and diffused manner. As shown in FIGS. 3a and 3b, through the application of hinged connections 40 and 42, the user can manipulate the angular positions of upward extension 14 and reflector housing 16 to adjust the angular position of reflector 18 with respect to the light source, and thereby enables the user to increase and/or decrease the amount of light being directed toward display screen 7 corresponding to the angular position of the reflector. In other embodiments (not shown), hinges 40 and 42 can be eliminated and light assembly 10 with base portion 12, upward extension 14 and reflector housing 16 are predeterminately positioned and molded so as to provide the maximum lighting ability for the display screen 7 of the game device 5.

Figure 3C:
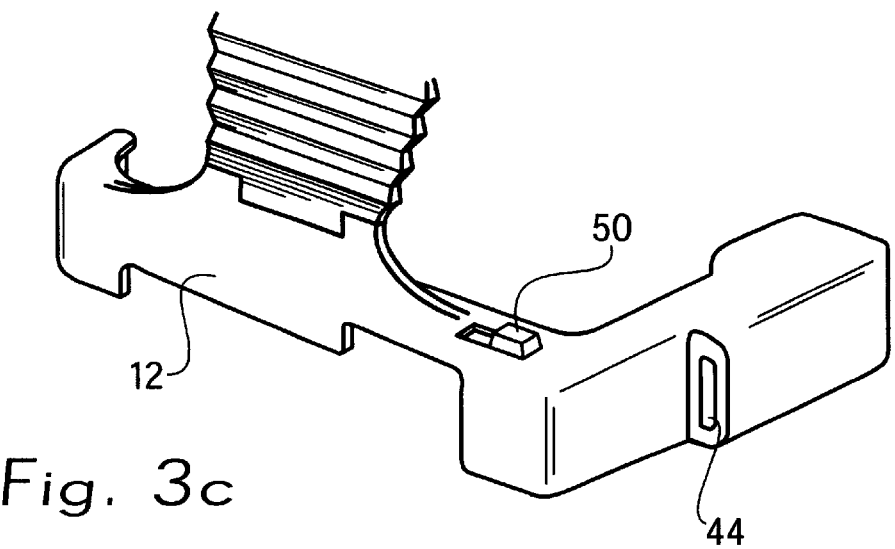
FIG. 3c is a perspective view of the base portion of the game light assembly according to another embodiment of the invention.

In view of the fact that light assembly 10 can utilize the link port of the game device 5 in order to obtain power, a link port 44 (FIGS. 3a and 3b ) is provided on the external surface of the base portion 12 so as to provide the user with all the functionality of such link port while the light assembly 10 is disposed in its operable position on the game device 5. FIG. 3c shows another embodiment of the positioning of link port 44 on the external surface of base portion 12. Those of ordinary skill in the art will recognize that the position of the externally provided link port 44 can be changed without departing from the spirit of this disclosure.

FIG. 5 shows a bottom view of the light assembly 10 and how the base portion 12 engages the game device 5 according to one preferred embodiment. The right side 26 of base portion 12 includes a small flange 52 adapted to engage the corresponding top corner of the game device 5. As described earlier, when base portion 12 is slid onto the top edge of the game device (see arrow direction in FIG. 1a) flange 52 snaps over the top corner edge of the game device. This "snap over" flange 52, in conjunction with the power supply connection 28 with the link port of the game device 5, secures the light assembly 10 into its operable position on the game device. Conversely, the removal of light assembly 10 simply requires the user to "un-snap" flange 52 from its secured position over the top edge and slide the base portion 12 of the light assembly in the reverse direction of the arrow indicated in FIG. 1a for removal from the game device 5.

Figure 6:
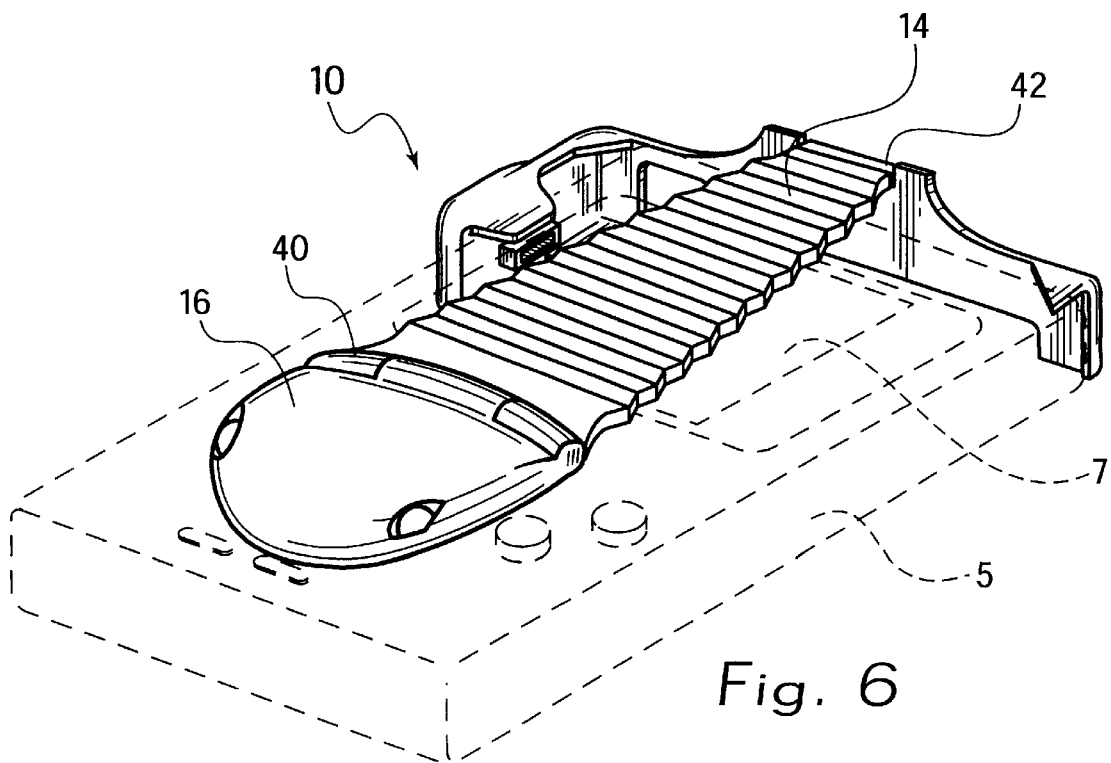
FIG. 6 is a perspective view of the game light assembly in an extended flattened position.

FIG. 6 shows the light assembly 10 in a flattened position over the game device 5. Through the hinged connection 40 of the reflector housing 16 with upward extension 14 and the hinged connection 42 of the upward extension with the base portion 12, the light assembly 10 can be flattened over the game device 5 and screen 7 as shown. This folding aspect (or unfolding) of the light assembly not only functions to place the light assembly 10 into a storage position without requiring its removal from the game device, but also functions to protect the upper surface of the game device 5.

Figure 7:
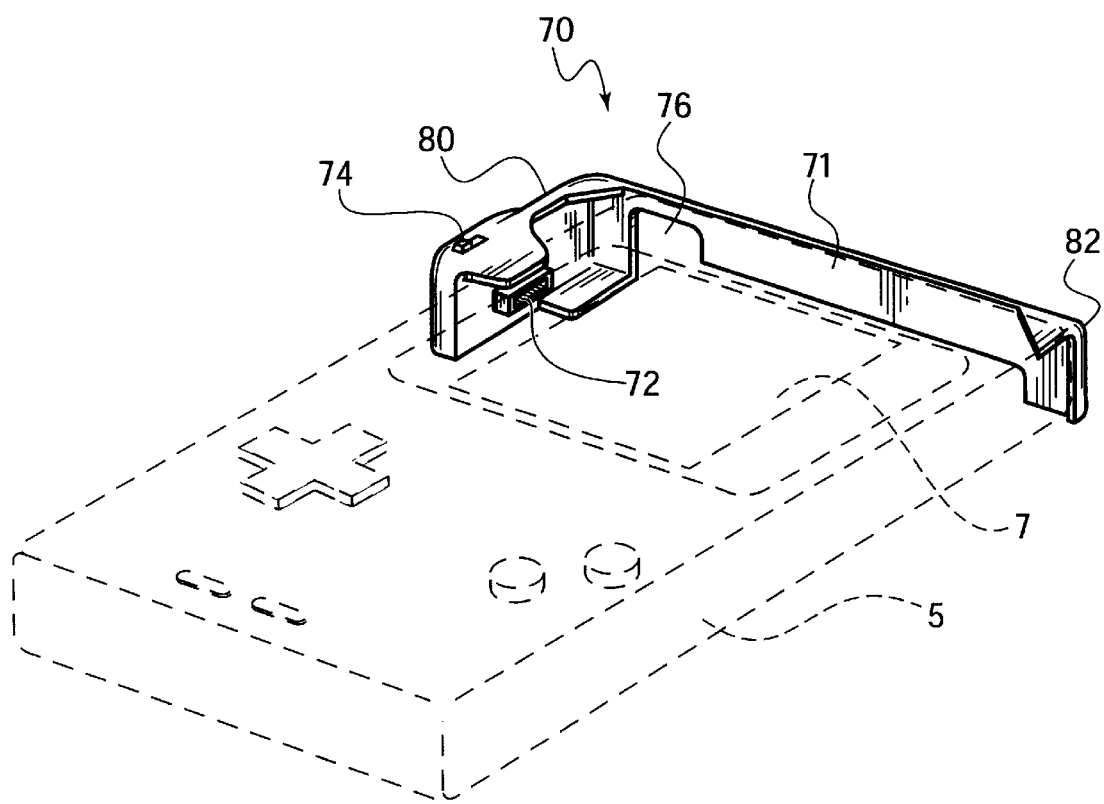
FIG. 7 is a perspective view of game accessory power supply connector for compact video game devices according to an embodiment of the present invention.
Figure 8:
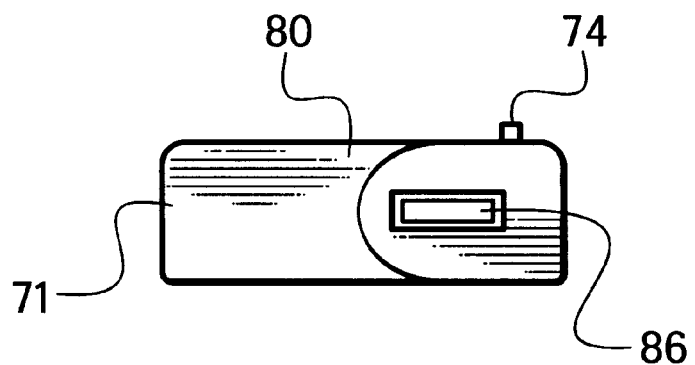
FIG. 8 is a side view of the game accessory power supply connector according to the invention.
Figure 9:
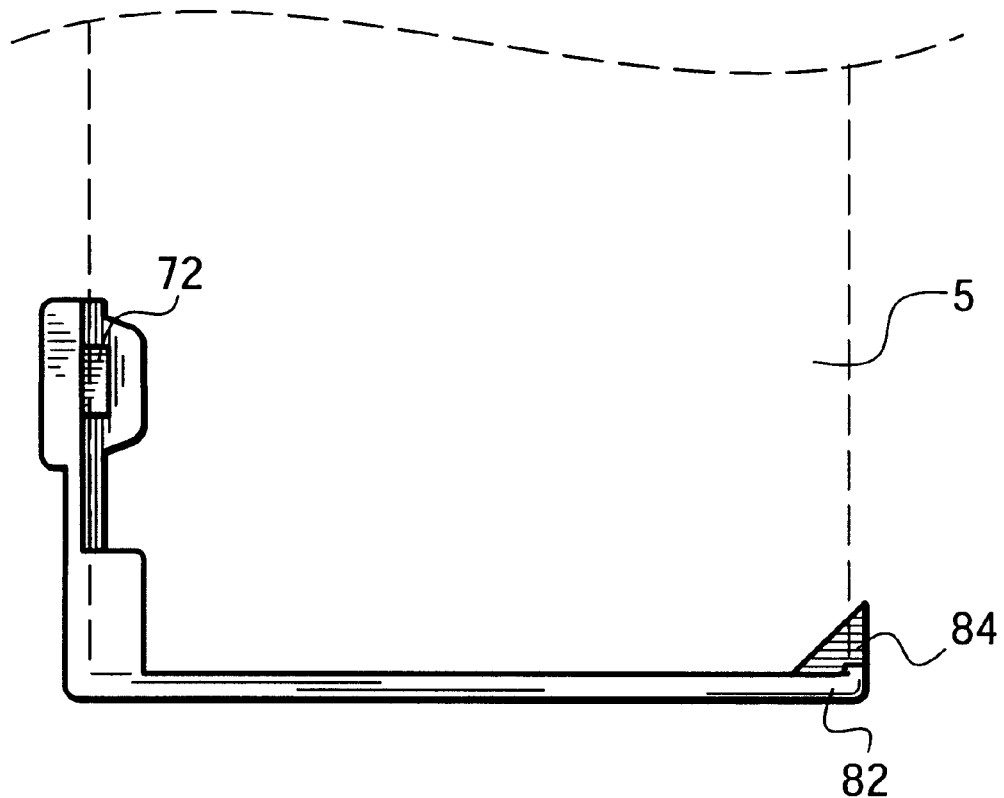
FIG. 9 is a bottom view of the game accessory power supply connector according to the invention.

FIGS. 7–9 shows a game accessory power supply connector 70 for use with any type of accessory item. The game accessory power supply connector 70 can be integrated into any type of accessory item for the game device. It is preferable that the particular type of accessory item be one that requires battery power to operate, thus enabling the use of the game device link port as described in several embodiment of the invention. Game accessory power supply connector 70 includes a base portion 71 that is substantially identical to the base portion 12 of the light assembly 10. Briefly, the base portion 71 includes left and right sides 80 and 82, respectively, the IR window—on/off switch opening 76, an on/off switch 74 and the power supply plug 72. Base portion 71 also includes an external link port 86 which can be variously positioned on connector 70 according to design choice.

The connection of the game accessory power supply connector 70 is also identical to that of the base portion 12 of the light assembly 10. Thus, when the connector 70 is slid onto the top edge of the game device (see arrow direction in FIG. 1a) flange 84 snaps over the top corner edge of the game device. This "snap over" flange 84 secures the connector 70 into its operable position on the game device. The removal of connector 70 is also identical to that of base portion 12 described earlier.

Figure 10B:
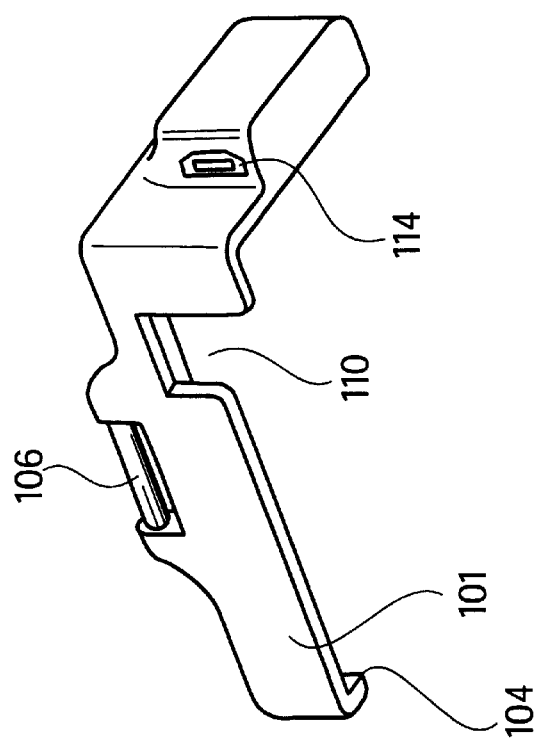
FIG. 10b is a bottom perspective view of the game accessory power supply connector for compact video game devices according to another embodiment of the invention.
Figure 10A:
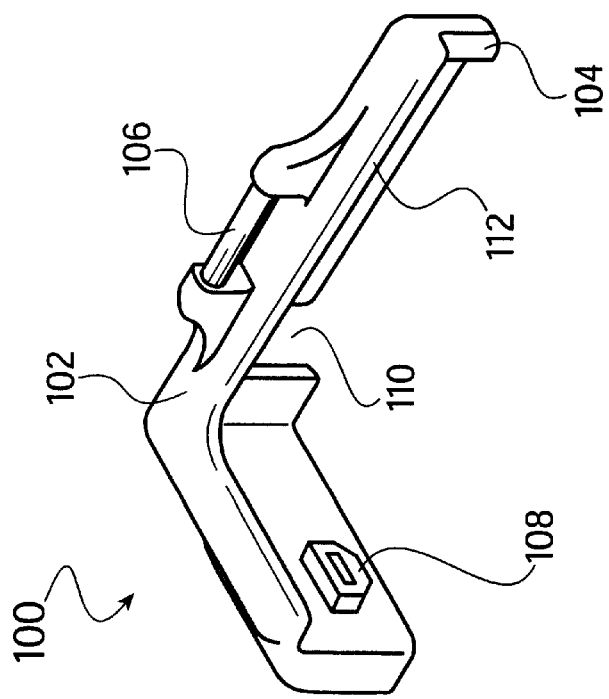
FIG. 10a is top perspective view of the game accessory power supply connector for compact video game devices according to another embodiment of the invention.

FIGS. 10a and 10b show a preferred embodiment for a game accessory power supply connector 100 according to the invention. Connector 100 has an upper surface 102 on which hinge 106 is disposed for connection to, for example, the upward extension 14 (FIGS. 1a and 1b). The rear side 101 of connector 100 includes the IR/on/off switch window 110 and the external link port 114 is provided on one side. Similar to the flange 52 described with reference to the embodiment of FIG. 5, connector 100 includes flange 104 adapted to snap over the top corner edge of the game device 5. The upper surface 102 of connector 100 is designed to be thicker than that of the previously discussed embodiments, and as such the structural integrity of the connector is substantially increased. Those of ordinary skill will appreciate that other designs for increasing the overall integrity and strength of the connector can be made without departing from the spirit of the present invention.

Figure 11:
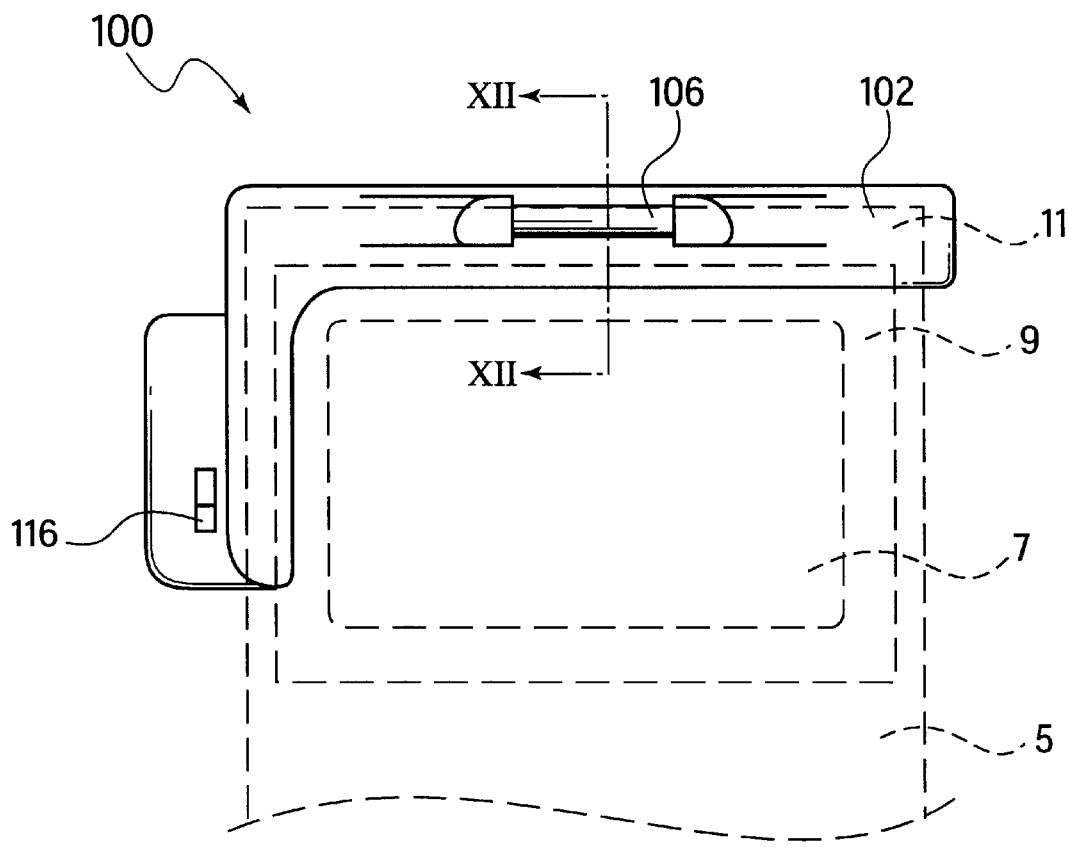
FIG. 11 is a top view of the game accessory power supply connector depicted in FIG. 10a as disposed on a compact video game device shown in phantom.
Figure 12:
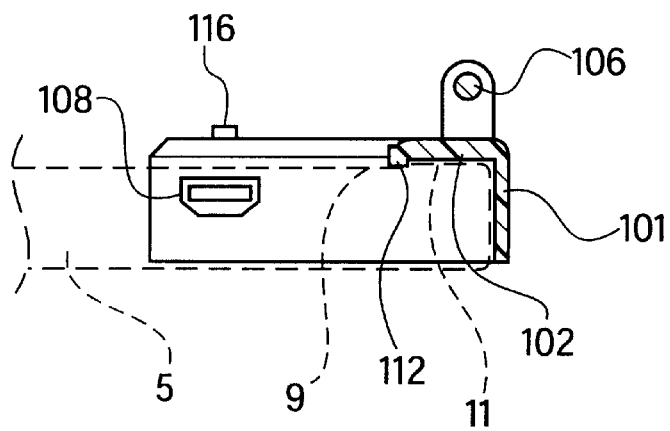
FIG. 12 is a cross-sectional view of the game accessory power supply connector taken along lines XII—XII of FIG. 11.

Connector 100 engages the game device 5 is a slightly more enhanced manner than that of the aforementioned embodiments. Referring to FIGS. 11 and 12, the game device 5 includes a display screen 7 that is covered by a glass or plastic panel 9 that is larger than the display screen. Panel 9 meets with the upper edge 11 of the game device 5 and is slightly recessed from this upper edge 11 so as to form a small ledge between the panel 9 and edge 11. Connector 100 includes a flange 112 extending downward from the upper surface 102 and positioned such that the upper surface 102 substantially extends across the upper edge 11 of the game device 5 and flange 112 engages over the small ledge formed with panel 9 and thereby secures connector 100 to the top edge of the game device 5. An optional on/off switch 116 is also provided.

Figure 13:
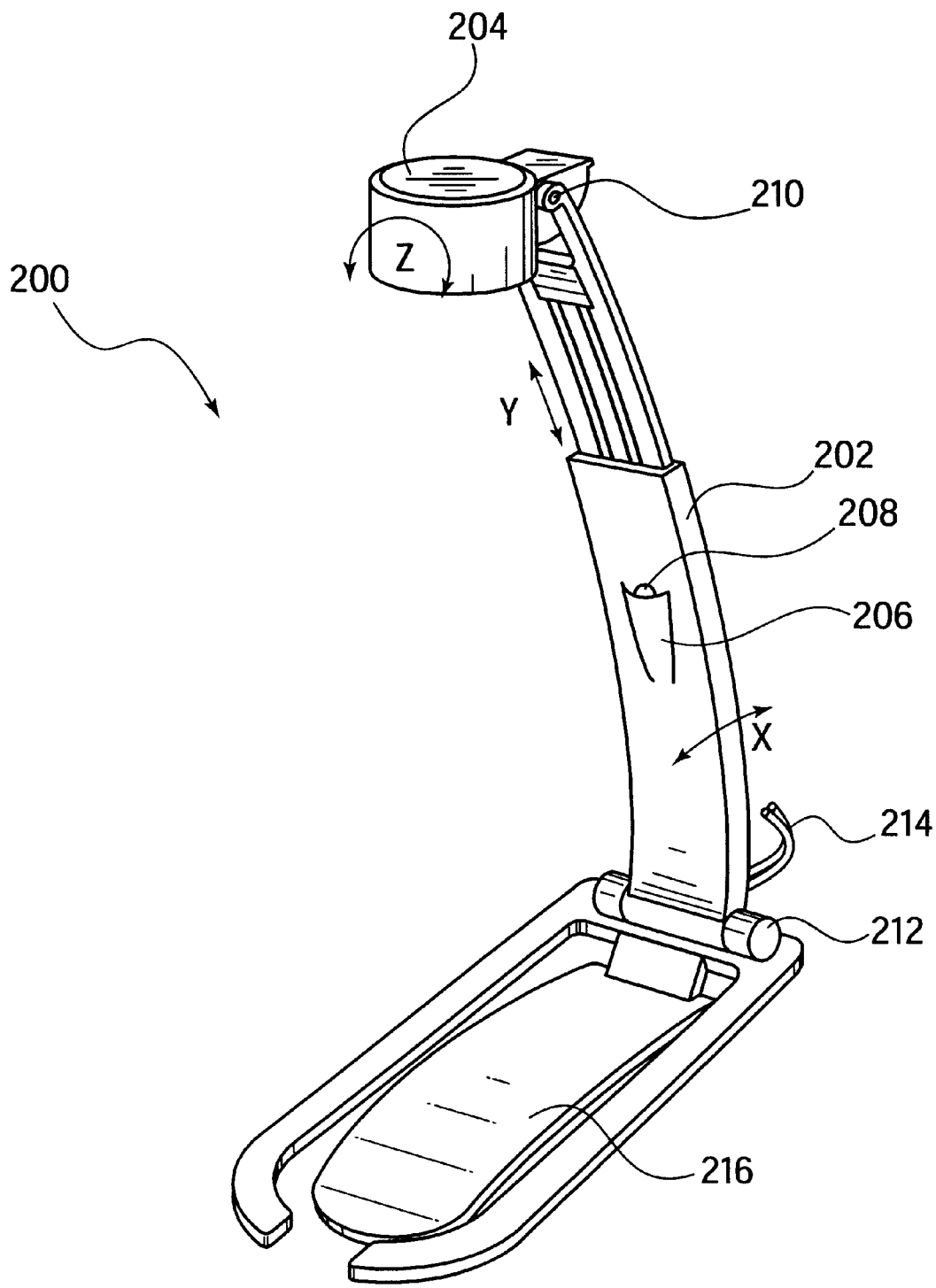
FIG. 13 is a perspective view of another embodiment of the accessory light apparatus of the invention.
Figure 14:
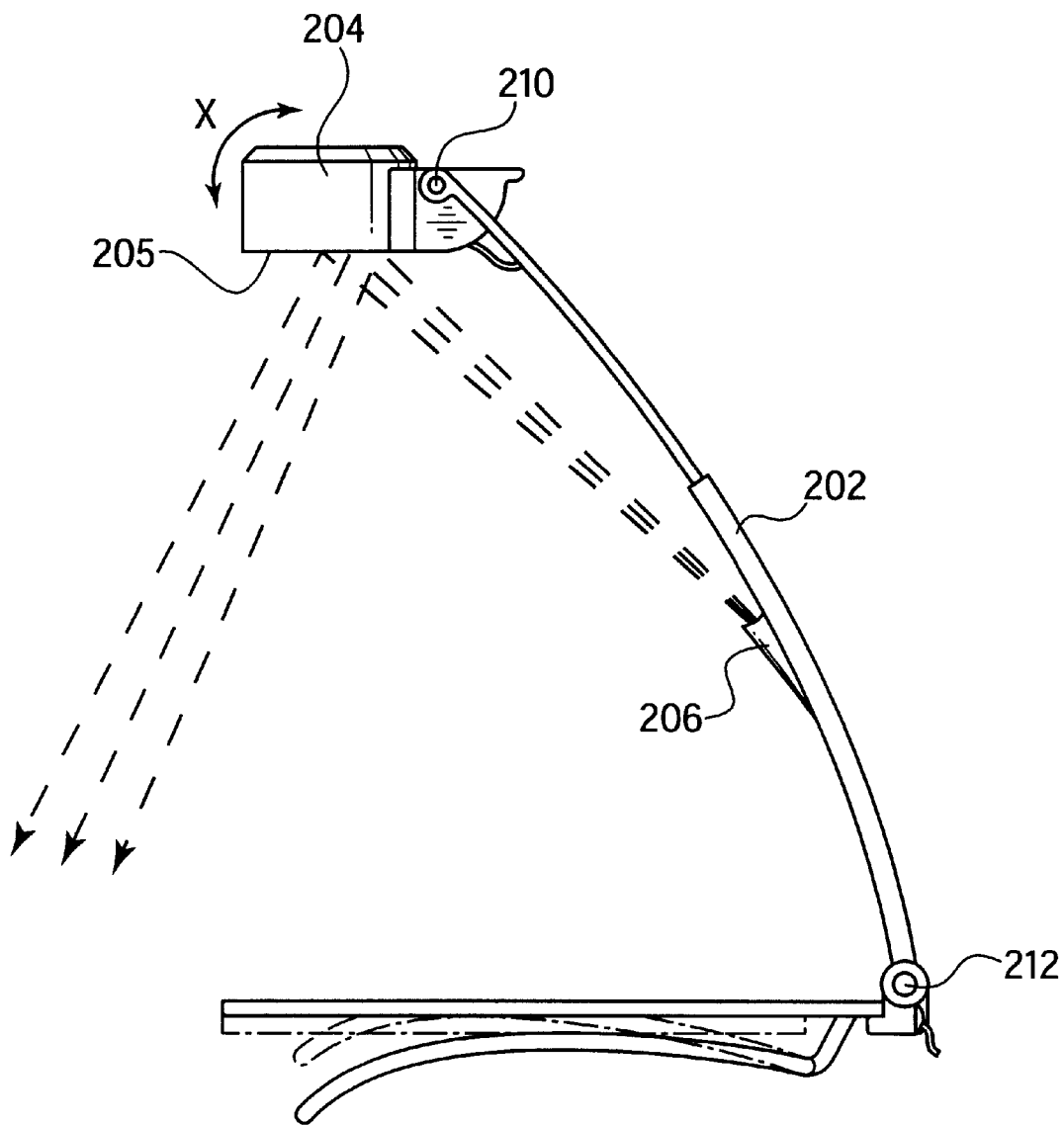
FIG. 14 is a side view of the embodiment depicted in FIG. 13.

FIGS. 13 and 14 show another example of the lighting system according to the present invention. In this embodiment, a book light 200 is used as an exemplary implementation of the lighting techniques of the present invention. Light 200 generally includes a lower portion 202 and an upper portion 204 pivotally connected to the power portion. A light source 208 is housed in a light source housing 206 and is directed upward away from the desired area. The upper portion 204 includes a reflector 205 mounted or integrally formed into the underside of the portion so as to be adjustably positioned to intercept the light from light source 208. In this manner, the light can be reflected by reflector 205 and directed at the user desired area through the pivotal connection of upper portion 204 with lower portion 202. As shown, upper portion 204 can be pivoted in two different planes. Thus, it may be pivoted about hinge 210 in an X direction and also pivoted in a perpendicular Z plane (direction). In this manner, upper portion can be adjusted to move the reflected light direction up and down (X direction) and side to side (Z direction) with respect to the user selected area. The base clip portion 216 is shown for exemplary purposes and may be replaced with any suitable known device for connecting the light 200 to a desired area.

Figure 15A:
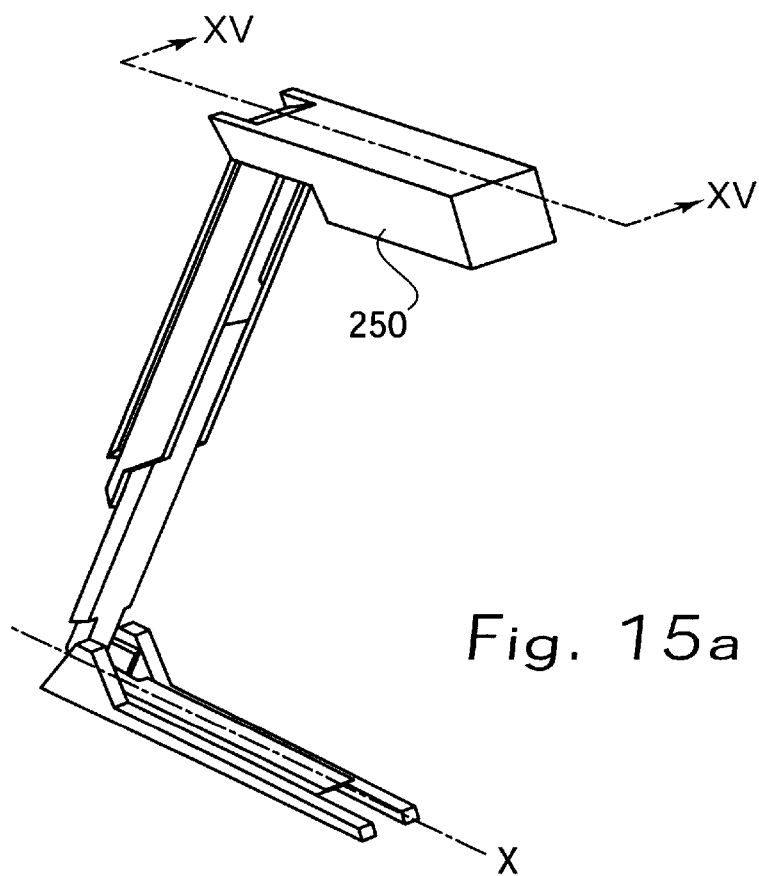
FIG. 15a is a perspective view of yet another embodiment of the accessory light apparatus of the invention.
Figure 15B:
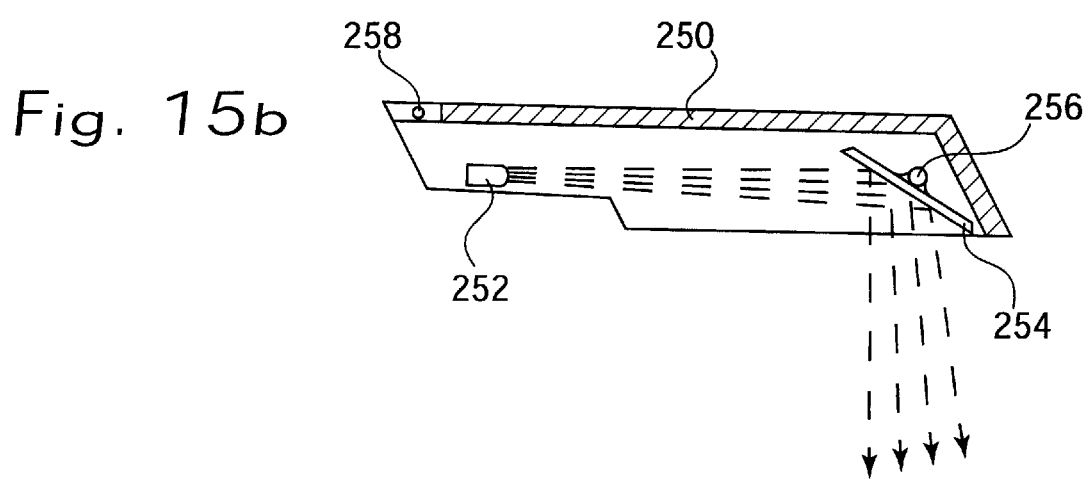

FIGS. 15a and 15b show another embodiment where the light source 252 is positioned in the same plane as the reflector 254 within a housing 250. As shown, the light source directs light at the reflector 254 which is pivotally connected 256 to the housing 250. In this embodiment, the housing 250 must be substantially positioned over the user selected area to be illuminated. However, the light source 252 is not directed at the user selected area for illumination, but rather is positioned so as to direct light toward the reflector 254. Thus, those of skill in the art will recognize that the reflection lighting technique as disclosed herein may be applied is many various ways without departing from the spirit of the invention.

While there have been shown and described and pointed out fundamental novel features of the invention as applied to preferred embodiments thereof, it will be understood that various omissions, substitutions, changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. An accessory light assembly for illuminating a user selected area for illumination, the light assembly comprising:

a light source positioned to direct light away from the user selected area; and reflecting means operatively positioned to intercept the light directed away from the user selected area and reflect it back toward the user selected area for illumination.

2. The light assembly according to claim 1, further comprising:

an upward extension having a lower end connected to said base portion, an opposing upper end and a recess, said light source being disposed within said recess.

3. The light assembly according to claim 1, wherein said reflecting means comprises a reflector disposed in a path of light generated by said light source.

4. The light assembly according to claim 1, further comprising power supply means for supplying power to said light source.

5. The light assembly according to claim 4, wherein said power supply means comprises a battery.

6. The light assembly according to claim 4, further comprising a power on/off switch electrically connected to said power supply means and said light source for selectively providing power to said light source.

7. The light assembly according to claim 1, wherein said light source comprises an incandescent light bulb.

8. The light assembly according to claim 1, wherein said light source comprises a light emitting diode.

9. The light assembly according to claim 1, wherein said light emitting diode is a directional light emitting diode.

10. The light assembly according to claim 2, wherein said lower end of said upward extension is pivotally connected to said base portion.

11. The light assembly according to claim 3, wherein said reflector comprises a mirror.

12. The light assembly according to claim 3, wherein said reflector comprises reflective mylar.

13. The light assembly according to claim 3, wherein said reflector comprises hot stamped chrome.

14. The light assembly according to claim 3, wherein said reflector is pivotally disposed in the path of generated light.

15. An accessory light assembly for illuminating a user selected area, the lighting assembly comprising:

a base portion;

an upward extension having a lower end pivotably connected to the base portion and an opposing upper end;

a light source directed away from the user selected area;

a reflector housing pivotally connected to the upper end of the upward extension and being selectively positionable to intercept the light directed away from the user selected area; and reflecting means disposed on an underside of said reflector housing for reflecting light directed away from the user selected area back toward the user selected area for illumination.

16. The light assembly according to claim 15, further comprising power supply means for supplying power to said light source.

17. The light assembly according to claim 16, wherein said power supply means comprises a battery disposed in one of said base portion, said reflector housing and said upward extension.

18. The light assembly according to claim 16, further comprising a power on/off switch electrically connected to said power supply means and said light source for selectively providing power to said light source.

19. The light assembly according to claim 15, wherein said light source comprises one selected from a group consisting of an incandescent light bulb, a light emitting diode and a directional light emitting diode.

20. The light assembly according to claim 15, wherein said reflecting means comprises a flat reflector.

21. The light assembly according to clam 15, wherein said reflecting means comprises a mirror.

22. The light assembly according to claim 15, wherein said reflecting means comprises reflective mylar.

* * * * *